United States Patent
Yao et al.

(10) Patent No.: US 7,640,288 B2
(45) Date of Patent: Dec. 29, 2009

(54) SCHEMA FOR LOCATION AWARENESS

(75) Inventors: Yinghua Yao, Bellevue, WA (US);
Mohammad Shabbir Alam, Redmond, WA (US); Vivek Bhanu, Bellevue, WA (US); Warren V. Barkley, Mill Creek, WA (US); David Buerer, Bellevue, WA (US); Denise Chen, Bellevue, WA (US); Florin Teodorescu, Redmond, WA (US); Mark Huyler, Kirkland, WA (US); John C. Krumm, Redmond, WA (US); Christopher J. Lang, Seattle, WA (US); Tim McGrath, Redmond, WA (US); Timothy M. Moore, Bellevue, WA (US); Madhurima Pawar, Bellevue, WA (US); Geoffrey Pease, Bothell, WA (US); Steven A. N. Shafer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1242 days.

(21) Appl. No.: 10/800,543

(22) Filed: Mar. 15, 2004

(65) Prior Publication Data

US 2005/0204014 A1  Sep. 15, 2005

(51) Int. Cl.
*G06F 15/16* (2006.01)
(52) U.S. Cl. ............... 709/200; 709/217; 709/206; 709/204; 709/223; 455/457; 455/456.1; 455/456.3; 455/414.2
(58) Field of Classification Search ............. 709/200, 709/223, 225, 229
See application file for complete search history.

(56) References Cited

U.S. PATENT DOCUMENTS

| | | | |
|---|---|---|---|
| 5,696,799 | A | 12/1997 | Kainulainen |
| 5,699,431 | A | 12/1997 | Van Oorschot et al. |
| 6,198,914 | B1 | 3/2001 | Saegusa |
| 6,664,925 | B1 | 12/2003 | Moore et al. |
| 6,684,250 | B2 | 1/2004 | Anderson et al. |
| 6,768,994 | B1 | 7/2004 | Howard et al. |

(Continued)

FOREIGN PATENT DOCUMENTS

WO   WO 01/69951 A1   9/2001

(Continued)

OTHER PUBLICATIONS

Bluetooth Positioning, Bluesoft, Inc., 2, at http://www.bluesoft-inc.com/bluetooth.asp (last visited Jun. 10, 2003).

(Continued)

*Primary Examiner*—Jude J Jean Gilles
(74) *Attorney, Agent, or Firm*—Wolf, Greenfield & Sacks, P.C.

(57) ABSTRACT

A method, schema and computer system for a location service provides data structures that are extensible by allowing different types of location awareness applications to retrieve and deposit location data. The method includes providing an abstract location object arranged in a schema to enable servicing a received request for a logical location of an electronic endpoint; and arranging one or more location elements within the context of the abstract location object. The location elements are configured to act as peers relative to the logical location and each location element is configured to act as a proxy relative to any other location element within the abstract location object.

45 Claims, 8 Drawing Sheets

U.S. PATENT DOCUMENTS

| | | |
|---|---|---|
| 6,845,241 B2 | 1/2005 | Edlund et al. |
| 6,920,440 B1 | 7/2005 | Barson |
| 6,950,876 B2 | 9/2005 | Bright et al. |
| 6,952,712 B2 | 10/2005 | Yoshimura et al. |
| 2001/0047407 A1 | 11/2001 | Moore et al. |
| 2002/0032780 A1 | 3/2002 | Moore et al. |
| 2002/0143991 A1 | 10/2002 | Chow et al. |
| 2002/0176366 A1 | 11/2002 | Ayyagari et al. |
| 2003/0182394 A1 | 9/2003 | Ryngler et al. |
| 2004/0064568 A1* | 4/2004 | Arora et al. ............... 709/228 |
| 2004/0193707 A1 | 9/2004 | Alam et al. |
| 2004/0259567 A1 | 12/2004 | Valko |
| 2005/0198100 A1* | 9/2005 | Goring et al. ............... 709/200 |

FOREIGN PATENT DOCUMENTS

| | | |
|---|---|---|
| WO | WO 02/17075 A2 | 2/2002 |

OTHER PUBLICATIONS

Aeroscout WLAN Location System, Bluesoft, Inc., 1, at http://www.bluesoft-inc.com/wlan.asp (last visited Jun. 10, 2003).

Wireless Security, Bluesoft, Inc., 1, at http://www.bluesoft-inc.com/security.asp (last visited Jun. 10, 2003).

Ekahau Positioning Engine 2.0 Ekahau. 2 at www.ekahau.com (last visited Jun. 10, 2003).

Ekahau Positioning Engine 2.0 Ekahau, 2, at http://www.ekahau.com/products/positioninggengine/ (last visited Jun. 10, 2003).

Ratnam et al. A Fully Distributed Location Management Scheme for Large PCs, http://www.cs.bu.edu/techreports/1999-010-dist-location-mgmt-pes.ps.Z, downloaded Apr. 3, 2009.

European Search Report from related European application No. 04007400.7 filed Mar. 26, 2004.

* cited by examiner

SCHEMA FOR LOCATION AWARENESS

CROSS-REFERENCE TO RELATED APPLICATIONS

This application relates to co-pending U.S. patent application Ser. No. 10/402,609, filed on Mar. 28, 2003, entitled "Architecture and System for Location Awareness" and naming Mohammad Shabbir Alam, Warren Vincent Barkley, Timothy M. Moore, Geoffrey E. Pease, Steven A. N. Shafer, Florin Teodorescu, Yinghua Yao, Madhurima Pawar and John C. Krumm as inventors, the application being incorporated herein by reference in its entirety.

FIELD OF THE INVENTION

This invention relates generally to computer systems and, more particularly, relates to a schema for location awareness of computer systems and computer devices.

BACKGROUND OF THE INVENTION

With the advent of the Internet and the growth of interactive applications available to computer users comes an increasing need for ubiquitous computing. In this context, ubiquitous computing means the ability of computers to affect most of a user's daily tasks. Computers are called "computers" because of their ability to "compute" or perform mathematical tasks. Computers are no longer seen as only computing machines, but are personal companions that are blending into the fabric of society in the form of personal digital assistants (PDAs) and personal information managers (PIMs), high functioning cellular phones and the like.

Computers no longer take up the space of an office to be able to compute pi to the $20^{th}$ decimal place and, instead, fit into the palm of a hand with the same computing power. Software developers cognizant of the personal companion persona of newer computing tools create user-friendly applications making the computing aspect of computers nearly invisible to users. Such technology results in user interfaces closely resembling human-type interfaces in sharp contrast to prior art computer-readable punch cards required in the past. Another growing technology affecting the ubiquitous nature of computing is wireless technology. Increasing growth of wireless and wired communication networks and the newer types of wireless networks create a need for computers to take advantage of the communication abilities of computers. Wireless no longer means a cellular phone that must be hard-wired within a vehicle, as was known in the past. Modern lithium-ion type batteries and other small but powerful batteries enable cellular phones, PIMS, PDAs and notebook computers to operate for hours at a time without requiring recharging. The long-term operation of computing devices enables a user to move from place to place without concerns of recharging looming while using a device. However, the long-term operation by a user creates opportunities for development of new computing products heretofore not fathomed as being necessary or even possible. One type of new computing product can be referred to as a location awareness product type.

Current location awareness devices are fragmented, do not work together and are not extensible or unified. For example, global positioning systems, home networking systems, local area networks (LANs) and wireless phones connected to a computing system all are capable of providing data relevant from the location perspective to a computer system. There is no common denominator between these systems allowing synergistic utilization of the location data. Each device outputs location data in different formats. What is needed, therefore, is a location awareness system that allows for synergy among location awareness products to enhance a user's experience with a computer system and appropriate data structures and schemas to enable such a system to interact with different computer components. Regarding such a schema, what is needed is a schema that operates as an organizational element, enables the functioning for location awareness, and provides a semantic common denominator to promote interoperability.

BRIEF SUMMARY OF THE INVENTION

Accordingly, a method and schema for a location service includes an abstract location type that contains a variety of location elements. The location elements can include a position, an address, an spatial entity, and an electronic endpoint. The location elements can act as peers that represent a single logical location. The location elements also function as proxies for each other. According to an embodiment, applications which understand one type, but not another, function normally because a resolver populates the specific kind of location information a given application needs based on information determined from one or more other proxies that make up that location object. For example, an application that needs a position can ask a street address geocoder to resolve the address element of the schema, return a position, and store the returned position in the position component of the schema thereby enabling the application that can only understand position. The schema logically wraps disparate location elements that represent a given location.

Thus, the schema supports a location service is extensible and agnostic to the provider of the information and the technology used by the provider. The location service can be either a locally executed module or method or a distributed function that can be aggregated in the cloud.

A location object can be a collection of elements that defines a location and represents all the information known about any given location. For example, a location object can contain different types of data such as the street address, latitude/longitude, and building/floor/room.

The schema is configured to be extensible by providing a generic definition of the location element and location object, and by providing the ability to inherit from generic definitions. The schema is also configured to be flexible and can contain zero or more location elements, and each location element can be a location element or anything that extends from it. Applications, services and storage engines can choose to use any subset of the location elements. Location elements can be defined with attributes, such as the city name in a street address. Other location elements can be defined with attributes that include complex data types, referred to herein as nested types. For example, the uncertainty of a position can be described in a nested type. The uncertainty provides information enabling an application/service/storage engine to determine whether position data is accurate and to what extent.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

DETAILED DESCRIPTION OF THE INVENTION

Figure 1:
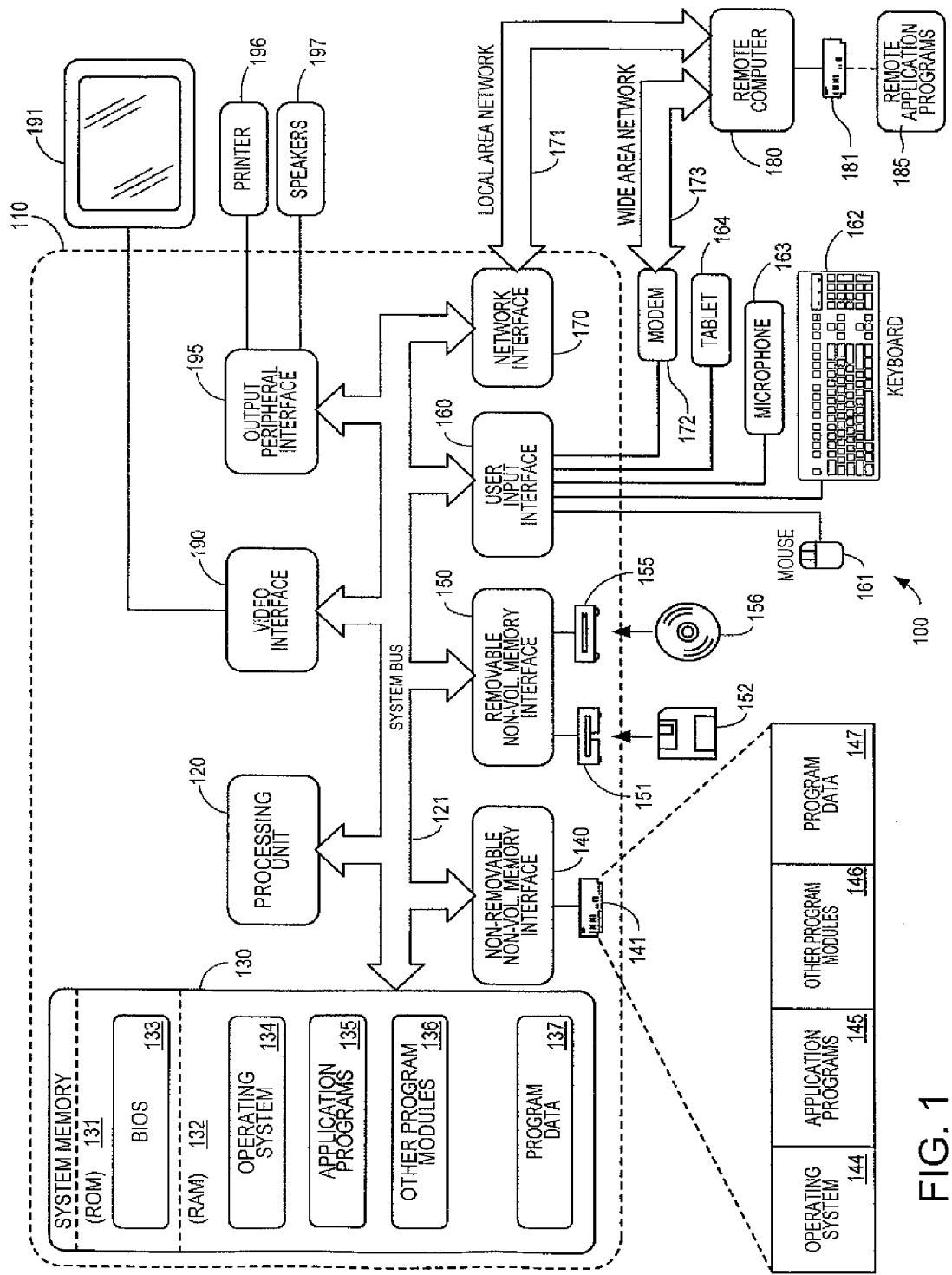
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
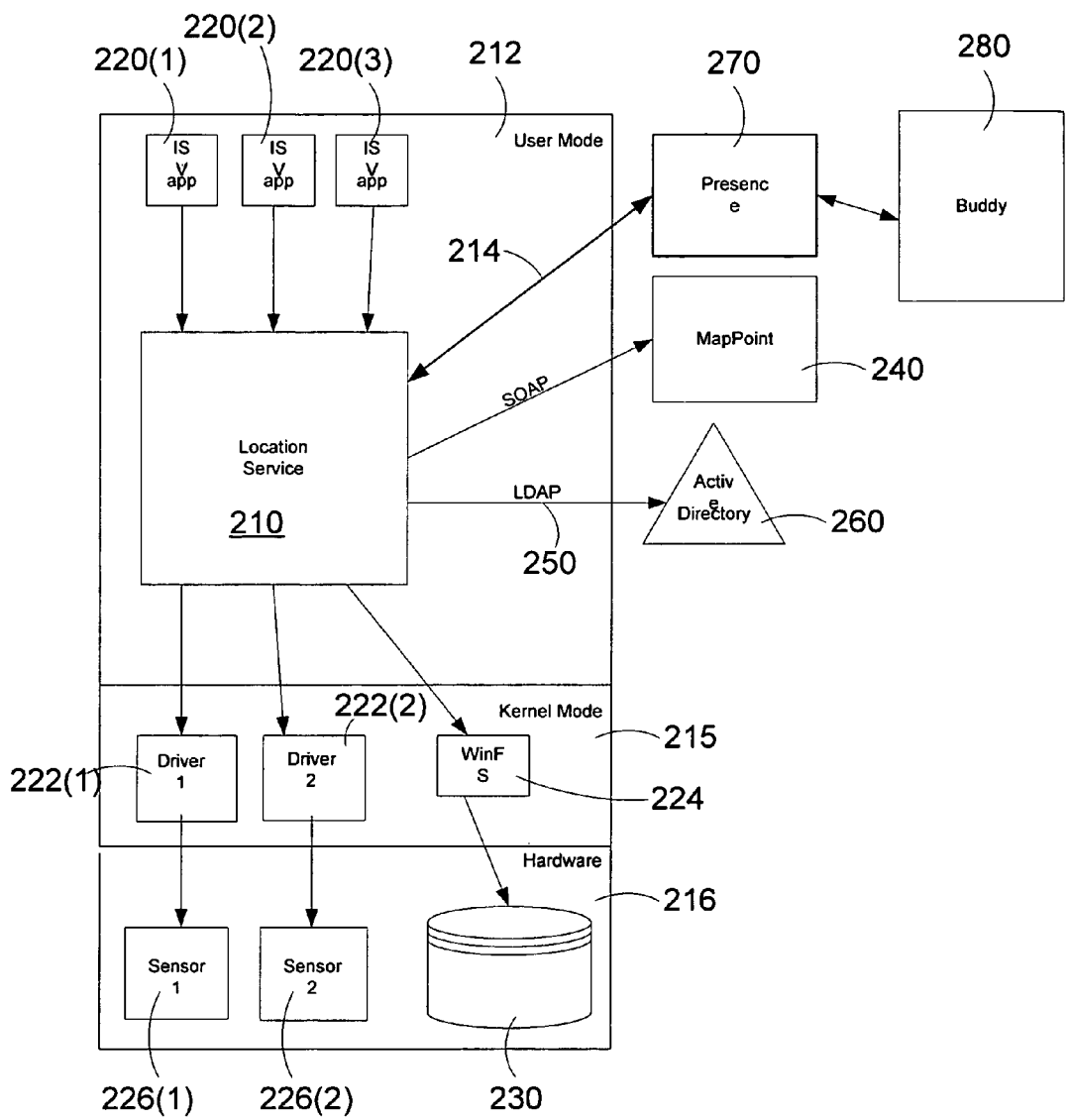
FIG. 2 is block diagram of an exemplary location aware architecture in accordance with an embodiment of the present invention.

Referring to FIG. 2, an exemplary overview block diagram illustrates an architecture for a location aware service 210. As shown, the location service 210 can be a user mode service 212 and can be installed on a computer, such as computer 110 or on a handheld computing device. Location service 210 interacts with a plurality of applications 220(1-3) and from outside the device/computer 214. Location service 210 is coupled within the device to kernel mode 215 component such as drivers 222(1-2) and a Windows® file system component 224. The drivers 222(1-2) and Windows® file system component 224 are shown coupled to hardware 216. Each device driver 222(1-2) is shown coupled to its respective hardware device 226(1-2). Windows® file system component 224 is shown coupled to a memory device 230, which could be a database for holding Windows® file system data. Location Service 210 can also be coupled to any compatible remote service, such as a MapPoint® application 240 or other application configured to query for location information and consistent with embodiments herein, or device to provide location data. Location service 210 is also coupled to active directory 260 via lightweight directory access protocol (LDAP) 250. Location Service 210 can also be coupled to an outside device/client 280, which could be coupled to a presence server 270 via a communication channel 214. More particularly, location service 210 could provide location information capable of being retrieved by, for example, a real time communication (RTC) client.

Figure 3:
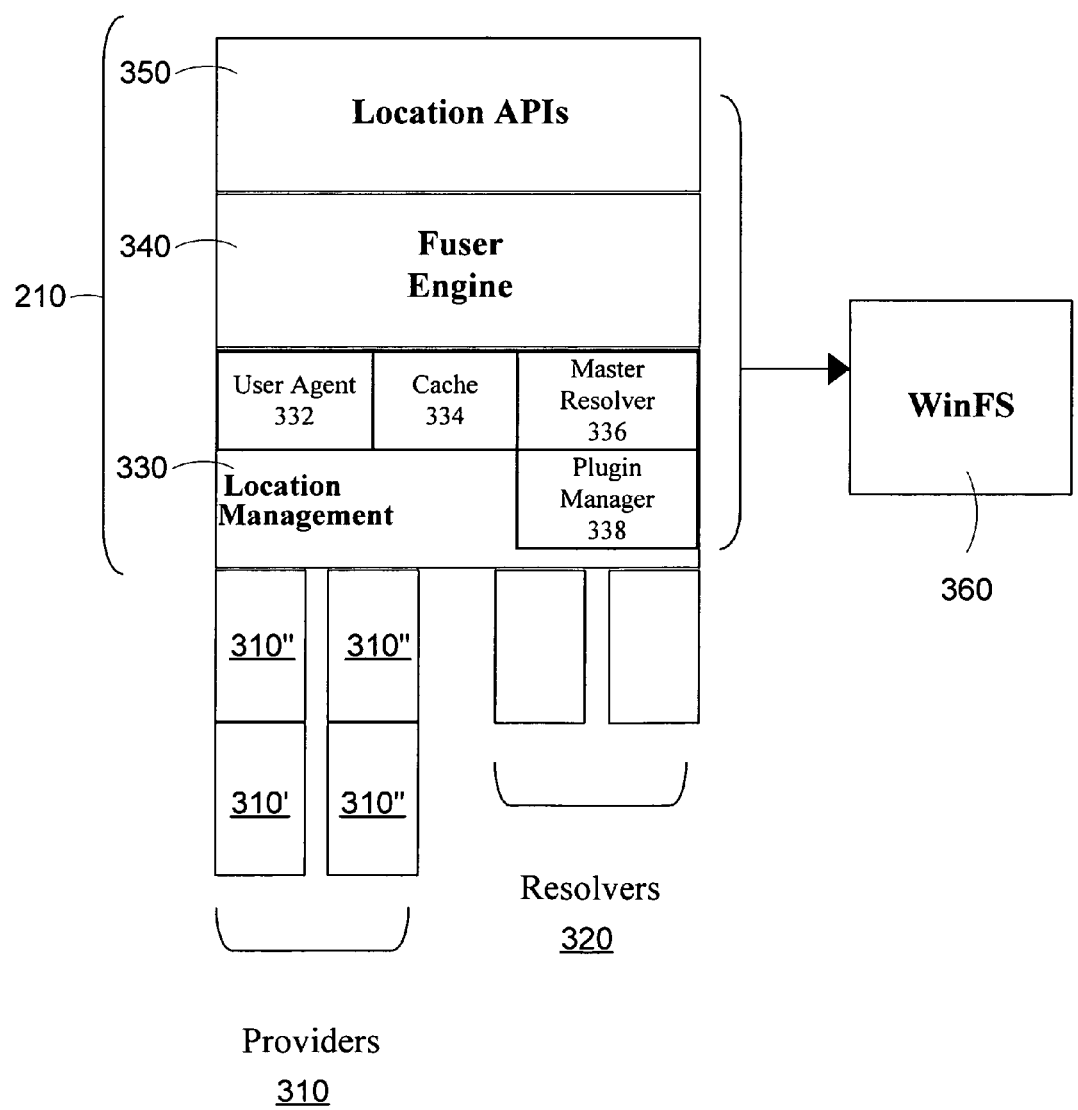
FIG. 3 is a block diagram of a location service within a location aware architecture in accordance with an embodiment of the present invention.

Referring now to FIG. 3, a block diagram illustrates location service 210 in further detail. As shown, the location service 210 includes one or more location application programming interfaces (APIs) 350, a fuser engine 340 and a location management component 330. The location management component 330 interacts with provider plugins 310" and resolvers 320. Location management component 330 can include a user agent 332, a cache 334, a master resolver 336 and a plug-in manager 338. FIG. 3 also illustrates providers 310', which can be providers of sensed data that require at least some interpretation, such as sensor-specific data. For example, a global positioning provider can provide many items of information, including and not limited to items such as time, angle, attitude, a latitude and a longitude. Providers 310' transmit sensed data to provider plugins 310" as device-specific location information or sensor-specific data from devices. Provider plugins 310" can normalize the data, translate the data according to the Location Schema, and transmit the data to location management component 330. Providers 310' can be capable of translating the data prior to transmitting the data to provider plugins 310". The capabilities of the providers 310' are subject to design requirements and limitations. For example, location management component 330 can obtain raw device information from one or more devices via providers 310' or other sources. Location management component 330 normalizes the data, and translates the data into location reports.

Location management component 330 can be configured within location service 210. Provider plugins 310" operate on the data, however, the plugin manager 338 which is part of the location management system will normalize the data before accepting it and passing it to master resolver 336. Each of the components: master resolver 336, fuser engine 340, and plugin manager 338 indicate readiness to accept information. Thereafter, applications and components that retrieve data do so only when components 336, 338 and 340 have data ready to be retrieved.

Resolvers 320 receive the sensed and translated data or, in some cases, raw location data, such as device specific location information, and interpret the data. Resolvers 320 can be implemented as plugins to location service 210 and can include device specific location information translators and data sources. Resolvers 320 function to translate device specific location information to rich location information by using data sources available to infer new data from existing data. In one embodiment, a resolver 320 can translate at least a portion of the data received from one or more devices. Each resolver 320 could be capable of interpreting at least one type of raw or partially-decoded data from a provider 310 and/or be configured to interpret data from another resolver. For example, a resolver 320 could be dedicated to interpreting only 802.11-type data. The resolver would then register with location management component 330 as interpreting only 802.11-type data and would receive only that type of data.

Additionally, each resolver 320 can be configured to translate information of another resolver, in which case the resolver might not be capable of translating raw data or partially decoded data, but could also be capable of resolving both raw data, data produced by a provider and data produced by another resover. FIG. 3 also shows Windows® file system (WinFS) component 360 that receives data from location service 210.

Fuser engine 340 generates a current location object. Location service 210 checks current location data via a plug-in or several plugins, including provider plugins 310" and resolver plugins 320. In this context, a plug-in can be implemented as one or more dynamically loadable libraries or dynamic link libraries (DLLs) or other dynamically loadable module capable of expanding the capabilities of software, firmware, or system components. In one embodiment, a notifications application is created on top of a notifications platform for WinFS or other appropriate system that checks to see if there is a match between what an application cares about and the current location. In an embodiment, an assembly contains one or more DLLs; a lower granularity level of dynamically loadable modules is represented by .NETMODULE files.

System Overview

Figure 4:
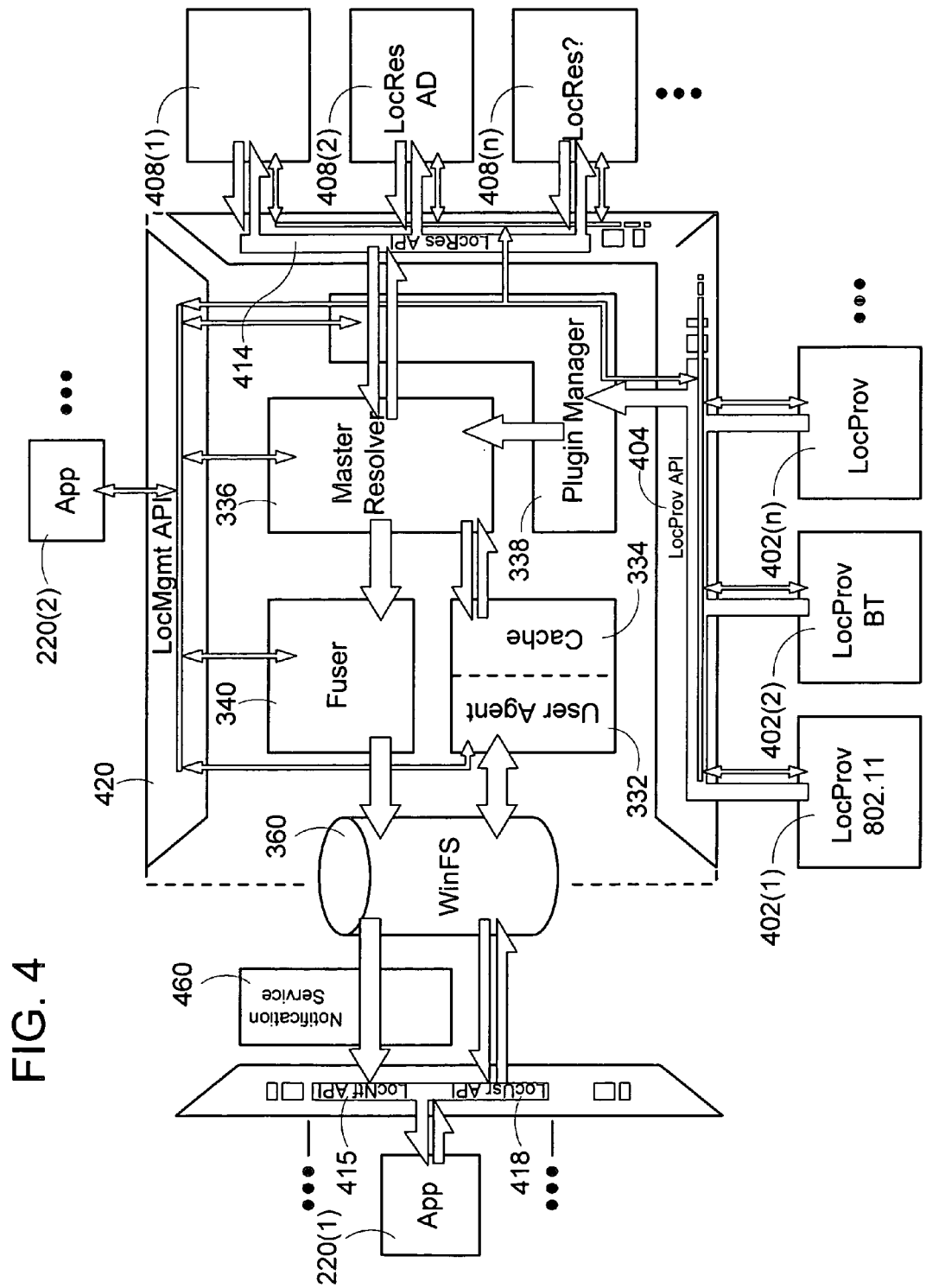
FIG. 4 is a block diagram showing exemplary connections of the location aware system including application programming interfaces in accordance with an embodiment of the present invention.

Referring now to FIG. 4, a block diagram of location system 210 and surrounding components in general illustrates that location service 210 acts as a framework agnostic of any applications, and agnostic as to devices and data sources from which information is obtained. Location service 210 is shown including fuser engine 340, a cache 334, user agent 332, a plug-in manager 338 and master resolver 336. Location service 210 further includes WinFS SQL server 360, shown as an exemplary server only, location provider API 404, location resolver API 414, location notification API 416, location user API 418, and location management API 420. WinFS SQL server 360 couples location service 210 to a notification service 460 and to a user notification API LocUsr 418 and a location notification API 416. APIs 416 and 418 can interact with an application 220.

Location user API 418 allows an application to query for the current location of the computer running location service 210. Location resolver API 414 specifies what functions need to be implemented by a plugin in order to register with the service. As shown, location user API 418 receives data from WinFS server 360 and passes the data to one or more applications 220(1-n). Location management API 420 receives data from a plurality of components such as fuser engine 340, user agent 332, cache 334, plugin manager 338 and master resolver 336 and passes data back and forth to one or more applications 220. Location management API 420 allows the parameters of the service and components to be configured. Location management API 420 also allows providers and resolvers to be added and removed. Location notification API 416 receives data from notification service 460 and passes data to applications 220. Location notification API 416 allows an application to register to be notified when the location of the computer running the service has changed. In one embodiment, a separate API, an application registration API allows applications to register for notifications and determining a current location. Applications must first register to obtain location data. Once registered, an application can choose to be notified for predetermined reasons. Location resolver API 414 sends and receives data from plugin manager 412 and master resolver 336 and transmits the data to location resolver user/Windows® database 408(1), location resolver Active Directory 408(2), and location resolver MapPoint® 408(3), as well as other location resolvers that could benefit from the location data. Master resolver 336 is responsible for managing the resolution of location information. When plugin manager 412 passes to master resolver 336 device-specific location information, master resolver 336 routes the data to the resolvers that are both free and able to resolve the information.

Specifically, referring to FIG. 4, the flow through location service 210 can be described by an example, beginning with providers 402. A provider, for example, an 802.11 provider obtains scan data. If the provider 402 determines that there are new access points, the provider bundles the media access control (MAC) address and signal strength information into an 802.11 report. The 802.11 provider signals that information is ready for plugin manager 338. Plugin manager 338 picks up the sets of information and signals master resolver 336 that there is a new location report to be resolved.

Next, master resolver 336 retrieves the location report from plugin manager 338. Next, master resolver 336 passes the location report to user agent 332.

User agent 332 checks cache 334 for this location report. Cache 334 possibly returns a miss. If so, cache 334 caches the data and checks a backend. By checking the backend of cache, a user's location could be determined based on the location report. If cache does not determine the user's location, user agent 332 generates a miss.

After user agent 332 generates a miss, master resolver 336 passes the location report to a resolver 408, such as active directory (AD) resolver 408(2). AD resolver 408(2) locates the MAC address information in the location report, connects to Active Directory and finds the location of the access point. Next, AD resolver 408(2) returns the location of the access point to master resolver 336 as a location report. Next, master resolver 336 passes the location report to user agent 332. User agent 332 checks cache 334 for a match with the location report returned by AD resolver 408(2). If cache 332 generates a miss, user agent 332 caches the AD report. Next, user agent 332 then checks WinFS 360 to find any saved locations that relate to the location report generated by AD resolver 408(2). If nothing is found, user agent 332 informs master resolver 336 that there is no additional data. Next, master resolver 336 signals to fuser engine 340 that there is data to be retrieved. Fuser engine 340 retrieves two location reports, including an 802.11 location report and an AD location report. Fuser engine 340 fuses these reports and writes a location object representing the fused reports, and both the location reports into WinFS 360 as the current location. Notifications service 460, which can be configured to run on top of WinFS or an equivalent system generates a notification. The generated notification passes through a location notification API and onto the applications registered for the notification.

Location resolver API 414 is an interface between location service 210 and resolvers. Further, location resolver API 414 allows each resolver to notify the location service 210 that a resolver has new location information. Location resolver API 414 enables the resolver to transfer this information to location service 210. Location provider API 404 sends and receives data from location providers such as providers 402 (1-*n*) which can include an 802.11 provider, a Bluetooth provider, a global positioning system provider and other types of providers of location data. Location provider API 404 is an interface between location service 210 and providers. Location provider API 404 allows each provider to notify the service that it has new location information and transfers this information to the service.

Location provider API 404 and location resolver API 414 are both part of a plugin manager API. Plugin manager API further includes a plugin manager plugin, which is an interface between plugin manager 338 and a provider plugin 402. The plugin manager plugin interface provides data to both provider and resolver interfaces. Fuser engine 340 functions to fuse data obtained from master resolver 336. Fuser engine 340 generally resolves conflicts and unifies "reports" received from different resolutions of location awareness received from location providers. The data regarding location arrives via master resolver 336 that can filter the data and transmit the data to cache 334 and then to fuser engine 340.

User agent 332 functions to check cache 334 to determine whether the current location reports may be resolved further using cached data. User agent 332 further checks WinFS 360 to see if the current location reports indicate a location that a user has saved. Cache 334 functions to store resolution trees. FIG. 4 illustrates an architecture that can use location service 210 to provide applications 220 with the ability to query for a current location and the ability to be notified when the location of a user has been changed.

Schema

Figure 5A:
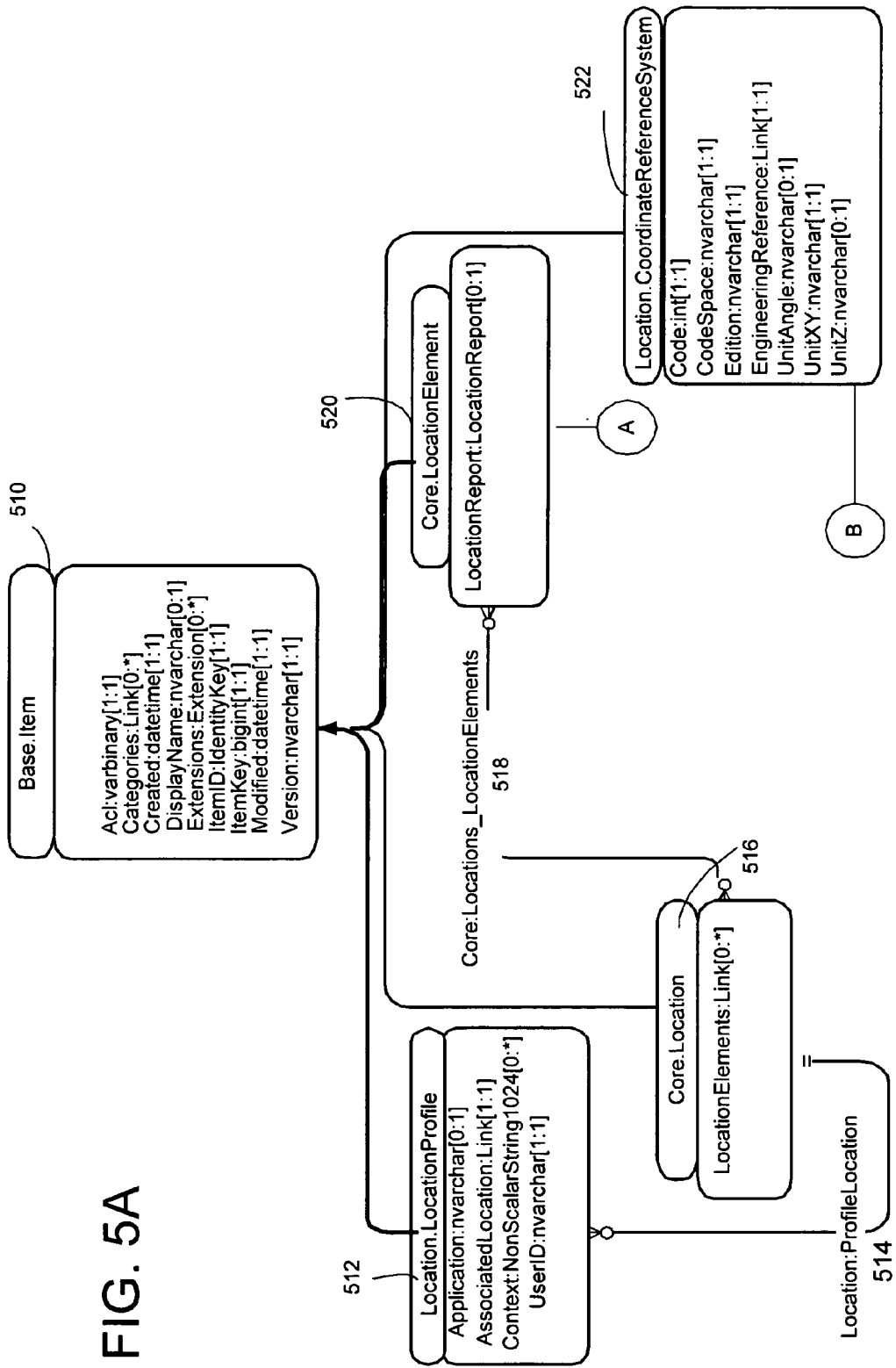
FIG. 5A is a conceptual diagram describes how the core types relate to each other and how they inherit from the basic WinFS item in accordance with an embodiment of the present invention.
Figure 5B:
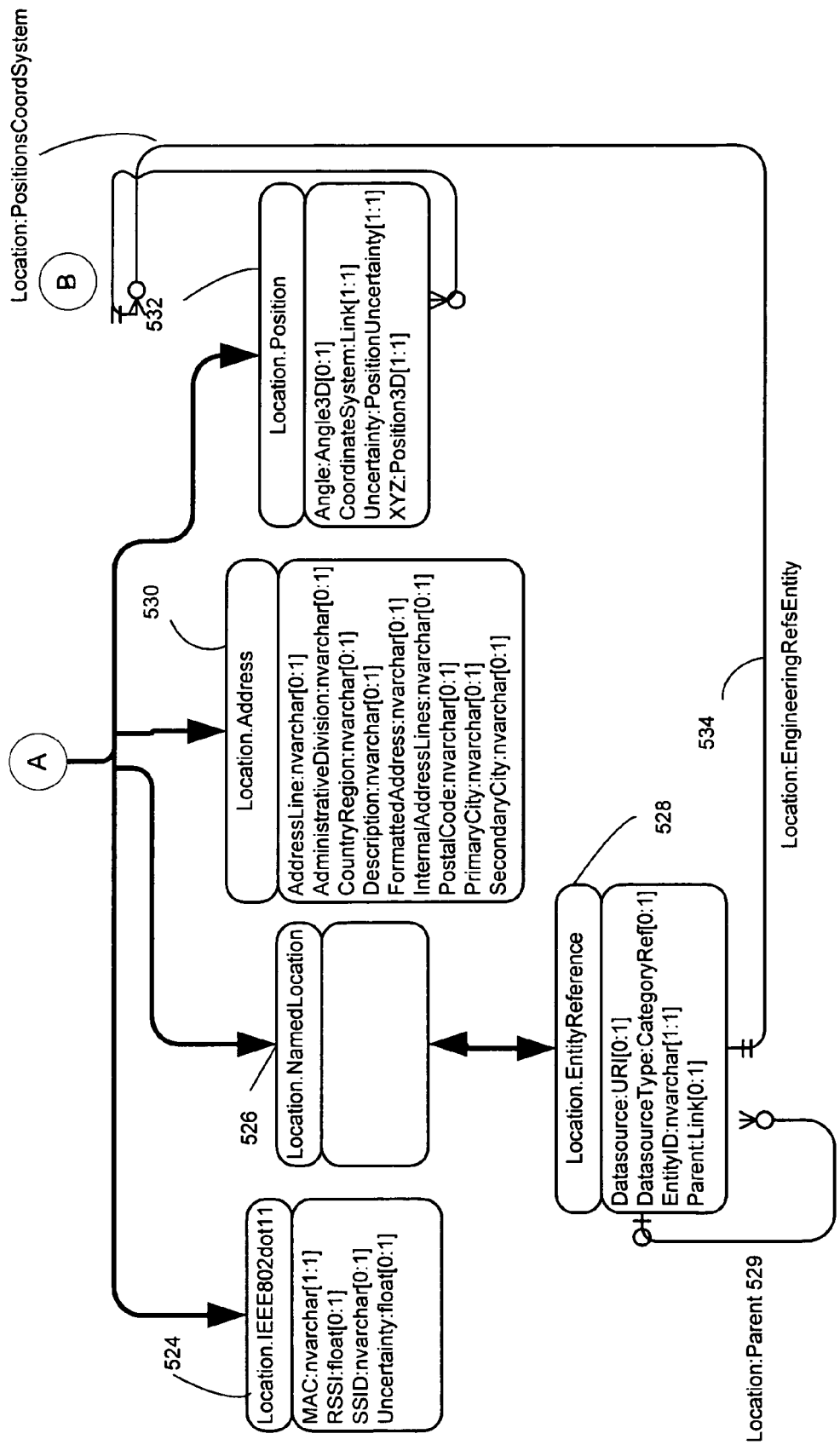
FIG. 5B is a continuation of the conceptual diagram in FIG. 5A illustrating core location elements describe indoors and outdoors location information in accordance with an embodiment of the present invention.

Referring now to FIGS. 5A and 5B, embodiments are directed to a schema for managing data and location aware applications. More particularly, as discussed above, processes within location service 210 enable an instantiation of a location object associated with location service 210 to pass all the location information to an application 220 as an extension of the location object.

FIGS. 5A and 5B illustrate data structures that enable the location object to be configured as a generic type of location information component that enables any application to store different or new types of location information into the component and to retrieve data from a common location without having to understand each component of the schema. For purposes of describing the schema, a location is defined as a collection of zero or more location elements each of which represents some type of location information. New location element types may be derived from the basic location element or any of the objects that are derived from it. Nested or helper types are used in location element definitions, and are also extensible themselves. The schema illustrated is a flexible and extensible location schema capable of working with location services, location databases and location aware applications. Additionally, the schema shown can be configured to be stored on devices with small amounts of memory and transferred quickly. Further, the schema is operable with applications 220 and services, such as the location service described above. Location service 210 can use different parts of the location schema. The schema further can operate with different types of location data. Different types of location data can be stored and integrated into the schema without interfering with or "breaking" existing applications and services. The schema shown is configured to enable a common location schema that enables third parties to provide location information to users, applications and services.

Figure 6:
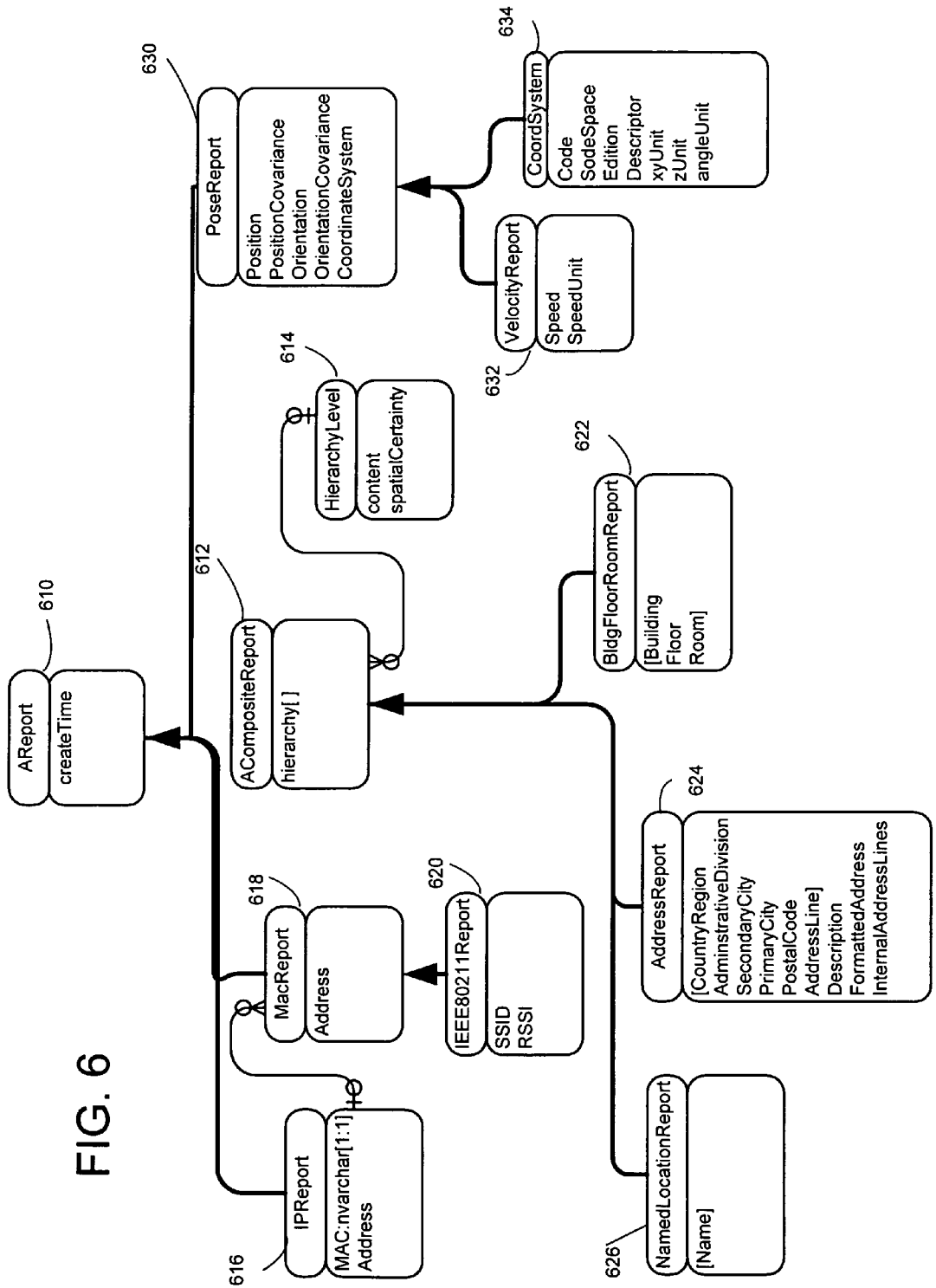
FIG. 6 is a conceptual diagram illustrating a more generic implementation of a schema in accordance with an embodiment of the present invention.

As shown, the conceptual diagram illustrated in FIGS. 5A and 5B demonstrates that different types of data can be stored using one schema. Further, applications cooperating with the schema may pick and choose which data to use. The diagram in FIGS. 5 and 6 illustrates the location object and a collection of location elements it can consist of. An application may understand some of these elements but does not need to understand all, and in particular it may understand some elements in a hierarchy and not their extensions. Thus, for example, Active Directory may be able to understand a MAC address and resolve it into a position which may be understood by a mapping application like MapPoint®. These separate elements can be combined into one object and presented as a multifunctional location object.

As described above, with reference to FIG. 5B, a physical location can be described in many ways: friendly name, address, position, building/floor/room, etc. The schema illustrated in FIGS. 5A and 5B shows how these descriptions may be accommodated through an extensible data structure.

The location profile allows applications, services and data stores to associate a location with some context. For example an application could use this associate the printer used at a home where the printer would be the context, the location would be home and the application would be referenced by some identifier. This is represented as a location profile object. FIG. 5A shows how this location object may be implemented in the WinFS schema definition language. The location object and the location element have already been explained in previously. A position is a type of location data. For example, a latitude, longitude pair specifies a location on earth. A coordinate system refers to the space in which the position is located. A possible implementation of the coordinate system object is shown on FIG. 5A. We have defined a coordinate system to include units for each of the three dimensions as well as an engineering reference. An engineering reference refers to an entity model. This is used to define new coordinate systems, and in particular can be useful for enterprise administrators that wish to define coordinate systems that describe their floor plans.

One important aspect of this schema design is that we include device information that can act as a proxy for a location as well as what is traditionally considered to be location data. For example the 802.11 location object includes the MAC address and the signal strength of the access point as perceived by the wireless NIC. This can be used by to infer the user's location because a user must be within a certain proximity to be connected to an access point and see a certain signal strength. Other examples of device information that can act as proxies are IP addresses and phone numbers. Anyone skilled in the art can extend this design to include other devices that have information that can be used to infer the user's location. FIG. 5B shows how the 802.11 object can be implemented in WinFS as a IEEE802dot11 object.

A named location is used to give a name to a location such as "Home", "Work" or "ABC enterprises". FIG. 5B shows how this may be implemented in WinFS as a named location object.

An entity reference is used to refer to entities that can describe locations hierarchically. Each entity reference is a node in this hierarchy that has zero or one parent, zero or more children. The entity reference also has a pointer to the data store and a schema that defines where the entire entity tree may be defined and how it can be accessed. Entities can be used for describing indoors location. For example one entity could be the building, it's child could be the floor, and it's child could be the room. Similarly an entity reference could refer to a reference to an entity that represents a building, that has a child which refers to an entity that represents a floor that has a child which refers to an entity that represents a room. FIG. 5B shows how an entity reference may be defined in WinFS. There are many ways to describe hierarchical locations.

An address refers to the street address of a location. The street address as defined here includes things such as the address line, city and administrative division. FIG. 5B shows how this may be implemented in WinFS.

A position refers to a point in a one, two or three dimensional coordinate space. It can be used to represent the latitude, longitude and altitude of a place on earth. A position has one, two or three scalar values representing the vectors in the coordinate space, a reference to a coordinate system, an uncertainty representing how accurate the position is, and it may have an angle in one, two or three space. FIG. 5B shows how this may be implemented in WinFS as a position object.

Referring now to FIG. 6, an embodiment is directed to a generic schema operable with traditional types of location information: address, position, etc, and proxies for location: MAC, IP, phone number and the like. The location information component can be configured as an extension to a basic location report that is generic for purposes of allowing any applications to utilize the schema.

The data flow diagram illustrates that a location schema according to embodiments disclosed herein can be composed of three types of reports, including device reports, logical reports, and position reports. More specifically, a user's location can be described in embodiments herein in at least three ways, including through devices nearby, an actual position and a logical association to an actual user position. The report including each type of location information is shown as a hierarchical report culminating in AReport 610 at the top of the diagram. AReport 610 is a base class for all location elements. All location objects extend from AReport 610 either directly or indirectly.

One of the three types of reports, the device report, is exemplified in FIG. 6 by objects shown as IPReport 616, MACReport 618 and Ieee80211 Report 620. The IPReport 616 contains information available to the network layer such as the IP address and the information available to the link layer. MACReport 618 contains information available to the link layer such as the MAC address. Ieee80211 Report 620 can be used to describe the signal strength and SSID of an access point as perceived from a user's device.

Logical location type reports are exemplified by AddressReport 624, BldgFloorRoomReport 622, and NamedLocationReport 626. Each of the AddressReport 624, the BldgFloorRoomReport 622, and NamedLocationReport 626 are provided to base class ACompositeReport 612 as the base class for logical reports. ACompositeReport 612 contains location information that represents a spatial hierarchy. For example, AddressReport 624 contains the country, administrative division, secondary city and primary city, and addressline. Each of the elements can represent a spatial hierarchy. Additional elements can be added as one of ordinary skill the art with the benefit of this disclosure will appreciate. For example, specific street address information can be included. BuildingFloorRoomReport 622 is also a logical location type of report and can contain building, floor and room information. Additional information can be added by adding elements to NamedLocationReport 626, which allows the user to name a location e.g. "Home" or "Work".

Each of the hierarchies in the logical report is a HierarchyLevel 614 object. HierarchyLevel object 614 contains the actual content that describes that hierarchy level. For example, content can include elements such as floor number and a spatial certainty parameter that provides a statistical certainty regarding the likelihood that the location service is correct regarding the location of a user relative to a given hierarchy.

Position type reports are shown as PoseReport 630, VelocitySensorReport 632 and CoodSystem 634. PoseReport 630 describes the position, angle, and coordinate system (via CoodSystem 634) of the user's location. VelocitySensorReport 632 extends from PoseReport 630 to describe the speed at which a user is traveling. Thus, the speed parameter and SpeedUnit provide a context for a position. A direction can be provided by CoordSystem 634, shown as holding elements Code, CodeSpace, Edition, Descriptor, xyUnit, zUnit, and angleUnit. As one of skill in the art with the benefit of this disclosure witll appreciate, the actual elements in each object are exemplary in nature and similar, expanded or reduced elements within each object are included within the general description of each object.

Figure 7:
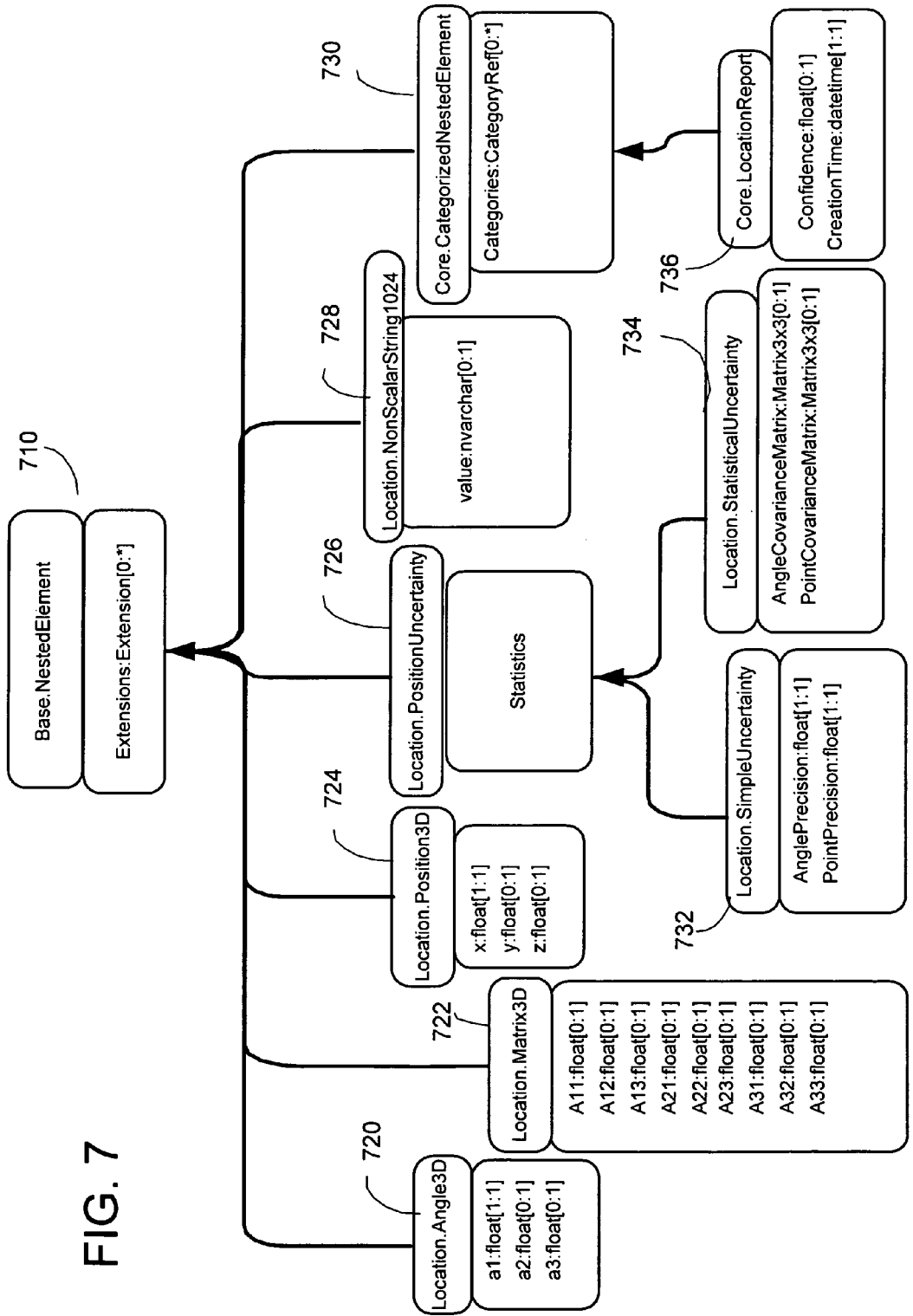
FIG. 7 is a conceptual diagram illustrating the nested elements which are used to define attributes of Location Elements and illustrates how they relate and inherit from a WinFS nested type according to an embodiment of the present invention.

FIG. 7 shows the supporting types that help describe the location but are not location descriptions themselves. Each type feeds into Base.NestedElement 710. Location.Angle3D 720 describes an angle in one, two or three space, as shown by parameters a1:float[1:1], a2:float[0:1] and a3:float[0:1]. Similarly, Location.Matrix 3D 722 is used in the statistical uncertainty type to describe statistical uncertainty in one, two or three space as a 3 by 3 covariance matrix. The covariance matrices for position or angle are the standard way to represent the spread of a Gaussian probability distribution whose mean is the actual position or angle. The Gaussian model represents a probability distribution that smoothly decreases farther from the mean.

In contrast, Location.SimpleUncertainty 732 represents a sharp cutoff of possible locations or angles at the edge of a sphere, using elements AnglePrecision:float[1:1] and PointPrecision:float[1:1]. For three dimensional locations, a covariance matrix is provided in Location.StatisticalUncertainty 734, which provide the 3×3 covariance matrices of PointCovarianceMatrix or AngleCovarianceMatrix. For two dimensional or one dimensional locations, the matrix can be used by zeroing the entries in the row(s) and column(s) of the matrix that correspond to the unused dimensions.

Location.Position 3D 724 denotes the vector representing the position in one, two or three space. Location.PositionUncertainty 726 is the abstract base class of a position. Any type for describing position uncertainty can derive from base class 726. Two types of uncertainty are illustrated as deriving from base class 726, including Location.Simple Uncertainty 732 and Location.Statistical.Uncertainty 734. A benefit of separating the types of uncertainty is that it allows developers to have both a simple solution if a coarse description of uncertainty is good enough, and a rich solution if a detailed description of an uncertainty is required.

A simple type of uncertainty contains nothing more than a scalar value for angle uncertainty and one for the position uncertainty. A scalar and angle can be used, for example, to denote a radius around the position in which the true position may lie. A statistical uncertainty contains a covariance matrix for angle uncertainty and one for position uncertainty. A matrix can be used to denote an uncertainty distribution that shows the probability of the true position being in a region around a given position. A location report captures the information the location service may tag to a location object such as the creation time. Such as, for example, when the user was at that location and the confidence of the user being in that location. In one embodiment, every location element contains zero or one location reports, shown as, for example, Core.LocationReport 736 to allow any location element generated by the location service to contain the extra information such as confidence and creation time. Core.LocationReport 736 feeds into Core.CategorizedNestedElement 730 as representing a type of nested element. Location.NonScalarString1024 728 is configured to hold nonscalar string values as needed.

In view of the many possible embodiments to which the principles of this invention can be applied, it will be recognized that the embodiment described herein with respect to the drawing figures is meant to be illustrative only and are not be taken as limiting the scope of invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come within the scope of the following claims and equivalents thereof.

We claim:

1. A method of operating a computer-implemented location service comprising acts of:
providing a location object arranged in a schema to enable servicing a received request for a logical location of a computing device;
arranging a plurality of location elements within the context of the location object, the location elements each comprising location information of a different type regarding the logical location of the computing device, each location element configured to act as a proxy that is used to infer any other location element within the location object;
receiving location information that is obtained based at least partially on sensed data from one or more hardware devices; and
responding to a request from an application by populating a response with one or more first location elements inferred from information received via one or more second location elements acting as proxies for the first location elements.

2. The method of claim 1 wherein the location elements include one or more of a position, an address, a spatial entity, and an electronic endpoint.

3. The method of claim 1 wherein each location element is capable of running autonomously without requiring an application using the location object to be operable with each location element within the location object.

4. The method of claim 1 wherein the schema logically wraps disparate location elements to represent a given location.

5. The method of claim 1 wherein the schema enables a location object to be populated by different processes which understand different elements of a single structure.

6. The method of claim 1 wherein the location object can include one or more of a wireless access point, an IP address, an email address, an Instant Message address, a phone number, a fax number as a logical location and location proxy.

7. The method of claim 1 wherein the schema is configured to hold multiple types of elements which represent a same logical location and can function as location proxies for each other.

8. The method of claim 7 wherein the elements are defined with attributes that include nested data types to provide a certainty of a location.

9. The method of claim 1 wherein the schema is configured via a hierarchical location aware data structure by providing one or more extensible abstract base classes independent of location data.

10. The method of claim 1 wherein the schema supports a location service, the schema being extensible and agnostic to a provider of location information and a technology used by the provider.

11. The method of claim 10 wherein the location service is one or more of a locally executed module and a distributed function of a computer network.

12. The method of claim 1 wherein the schema includes a Core.LocationElement data structure independent of location data, the Core.LocationElement data structure inheriting from one or more of a Location.IEEE802 dot11, Location- .NamedLocation, Location.Address, Location.Position, Location.EntityReference data structure.

13. The method of claim 12 wherein the Location.IEEE802 dot11 data structure is configured to capture a media access control (MAC) address, receive signal strength indication (RSSI), service set identifier (SSID), and an uncertainty associated with an access point for an 802.11 type device.

14. The method of claim 12 wherein the Location.IEEE802 dot11 data structure includes one or more of a MAC:nvarchar [1:1], RSSI:float[0:1], SSID:nvarchar[0:1] and Uncertainty: float[0:1].

15. The method of claim 12 wherein the Location.IEEE802 dot11 data structure includes one or more of a MAC:nvarchar [1:1], RSSI:float[0:1], SSID:nvarchar[0:1] and Uncertainty: float[0:1].

16. The method of claim 12 wherein the Location.NamedLocation data structure interacts with a Location.EntityReference data structure to provide one or more of a link, URI and an entity in an entity database.

17. The method of claim 16 wherein the Location.EntityReference includes one or more of a Datasource:URI[0:1], DatasourceType:Category Ref[0:1], EntityID:nvarchar[1:1] and Parent:link[0:1].

18. The method of claim 1 wherein the schema includes a Location.CoordinateReferenceSystem that includes data identity coordinates, the data identity coordinates including one or more of a Code:int[1:1], CodeSpace:nvarchar[1:1], Edition:nvarchar[1:1], EngineeringReference:link[1:1], UnitAngle:nvarchar[0:1], UnitXY:nvarchar[0:1], and UnitZ: nvarchar[0:1].

19. The method of claim 1 wherein the schema includes a Location.Address data structure to provide a physical address of a location, the data structure including one or more of AddressLin:nvarchar[0:1], AdministrativeDivision:nvarchar [0:1], CountryRegion:nvarchar[0:1], Description:nvarchar [0:1], FormattedAddress:nvarchar[0:1], InternalAddressLines:nvarchar[0:1], PostalCode:nvarchar[0:1], PrimarCity:nvarchar[0:1], and SecondaryCity:nvarchar[0:1].

20. The method of claim 1 wherein the schema includes a Location.Position data structure to represent the location of a location in a coordinate system, the data including one or more of an Angle:Angle3D[0:1], CoordinateSystem:Link[1: 1], Uncertainty:PositionUncertainty[1:1] and XYZ: Position3D[1:1].

21. The method of claim 1 wherein the schema includes a plurality of nested data structures holding one or more arrays and matrices of data in a hierarchical format to provide location data.

22. The method of claim 21 wherein the nested elements include one or more of Location.Angle3D, Location.Matrix3D, Location.Position3D, Location.PositionUncertainty, Location.NonScalarString1024, and Core.CategorizedNestedElement.

23. The method of claim 21 wherein the plurality of nested data structures further includes a data structure Location.StatisticalUncertainty configured to hold an array of data referring to a matrix for angle and point covariance.

24. The method of claim 21 wherein the nested elements includes a Location.SimpleUncertainly data structure configured to hold scalars AnglePrecision:float[1:1] and PointPrecision:float[1:1].

25. The method of claim 21 wherein the nested elements includes a Location.StatisticalUncertainty data structure configured to hold an array of data for a matrix for angle and point covariance, the Location.StatisticalUncertainty data structure including a AngleCovarianceMatrix:matrix3 [0:1] and a PointCoverianceMatrix:matrix3.times.3 [0:1].

26. The method of claim 21 wherein the nested elements includes a Core.LocationReport configured to capture data for the location service to determine a location and an uncertainty of the location.

27. The method of claim 26 wherein the Core.LocationReport includes Confidence:float[0:1] and CreationTime:datetime[1:1], the Core.LocationReport configured to inherit from data including a Core.CategorizedNestedElement and Categories:CategoryRef[0:*].

28. A computer readable medium on which is stored a schema organized to store and provide location data, the schema comprising:

a plurality of extensible abstract base classes configured to hold location elements that each comprise location information of a different type regarding a common logical location, each location element configured to act as a proxy that is used to infer other location elements in the schema, each abstract base class responsive to a plurality of applications to provide and store location data in the schema, including unrecognized types of location information; and a hierarchical data structure including the abstract base classes, the hierarchical data structure configured to enable formation of a location object.

29. The computer readable medium of claim 28 wherein the hierarchical data structure and the abstract base classes enable storing the schema in memory-limited devices.

30. The computer readable medium of claim 28 wherein the extensible abstract base class is represented by a Core.LocationElement data structure independent of location data, the Core.LocationElement data structure inheriting from one or more of a Location.IEEE802 dot11, Location.NamedLocation, Location.Address, Location.Position, Location.EntityReference data structure.

31. The computer readable medium of claim 28 wherein the schema includes a Location.Address data structure to provide a physical address of a location, the data structure including one or more of AddressLin:nvarchar[0:1], AdministrativeDivision:nvarchar[0:1], CountryRegion:nvarchar[0: 1], Description:nvarchar[0:1], FormattedAddress:nvarchar [0:1], InternalAddressLines:nvarchar[0:1], PostalCode: nvarchar[0:1], PrimarCity:nvarchar[0:1], and SecondaryCity:nvarchar[0:1].

32. The computer readable medium of claim 28 wherein the schema includes a Location.Position data structure to represent the location of a location in a coordinate system, the data including one or more of an Angle:Angle3D[0:1], CoordinateSystem:Link[1:1], Uncertainty:PositionUncertainty [11:1] and XYZ:Position3D[1:1].

33. The computer readable medium of claim 28 wherein the schema includes a plurality of nested data structures holding one or more arrays and matrices of data in a hierarchical format to provide location data, the nested data structure configured to be responsive to the base classes to load location data when needed.

34. The computer readable medium of claim 33 wherein the nested elements include one or more of Location.Angle3D, Location.Matrix3D, Location.Position3D, Location.PositionUncertainty, Location.NonScalarString1024, and Core.CategorizedNestedElement.

35. The computer readable medium of claim 33 wherein the plurality of nested data structures further includes a data structure Location.StatisticalUncertainty configured to hold an array of data referring to a matrix for angle and point covariance.

36. The computer readable medium of claim 33 wherein the nested elements includes a Location.SimpleUncertainly data structure configured to hold scalars AnglePrecision:float[1:1] and PointPrecision:float[1:1].

37. The computer readable medium of claim 33 wherein the nested elements includes a Location.StatisticalUncertainty data structure configured to hold an array of data for a matrix for angle and point covariance, the Location.StatisticalUncertainty data structure including a AngleCoverianceMatrix:matrix3[0:1] and a PointCoverianceMatrix:matrix3.times3[0:1].

38. The computer readable medium of claim 33 wherein the nested elements includes a Core.LocationReport configured to capture data for the location service to determine a location and an uncertainty of the location.

39. The computer readable medium of claim 38 wherein the Core.LocationReport includes Confidence:float[0:1] and CreationTime:datetime[1:1], the Core.LocationReport configured to inherit from data including a Core.CategorizedNestedElement and Categories: CategoryRef[0:*].

40. A computer system comprising:
a processor; and
a memory coupled to the processor, the memory storing a plurality of hierarchically arranged data structures in a schema, the hierarchical data structures configured to provide one or more extensible abstract base classes configured to retrieve and provide location data of a logical location, the abstract base classes responsive to a plurality of applications to provide and store location data in the schema, including unrecognized types of location data, the schema configured to enable servicing a received request for a logical location of a computing device, the schema configured as a location object with a plurality of location elements that each comprise location information of a different type regarding the logical location, each location element configured to act as a proxy that is used to infer other location elements within the location object.

41. The computer system of claim 40 wherein the location data includes one or more of an 802.11 type provider, a network location awareness (NLA) provider, a global position service (GPS) provider, a General Packet Radio Service (GPRS) provider data, and a Bluetooth provider.

42. The computer system of claim 40 wherein the schema includes a plurality of nested data structures holding one or more arrays and matrices of data in a hierarchical format to provide location data, the nested elements include one or more of Location.Angle3D, Location.Matrix3D, Location.Position3D, Location.PositionUncertainty, Location.NonScalarString1024, and Core.CategorizedNestedElement, Location.Angle3D, Location.Matrix3D, Location.Position3D, Location.PositionUncertainty, Location.NonScalarString1024, and Core.CategorizedNestedElement.

43. The computer system of claim 40 wherein the schema includes a plurality of nested data structures holding one or more arrays and matrices of data in a hierarchical format to provide location data, the nested elements including a data structure Location.StatisticalUncertainty configured to hold an array of data referring to a matrix for angle and point covariance.

44. The computer system of claim 40 wherein the schema includes a plurality of nested data structures holding one or more arrays and matrices of data in a hierarchical format to provide location data, the nested elements including a Location.SimpleUncertainly data structure configured to hold scalars AnglePrecision:float[1:1] and PointPrecision:float[1:1].

45. The method of claim 1, wherein a resolver within the location service is configured to perform the act of responding to a request from an application by populating a response with one or more first location elements inferred from information received via one or more second location elements acting as proxies for the first location elements.

* * * * *